United States Patent Office 3,460,251
Patented Aug. 12, 1969

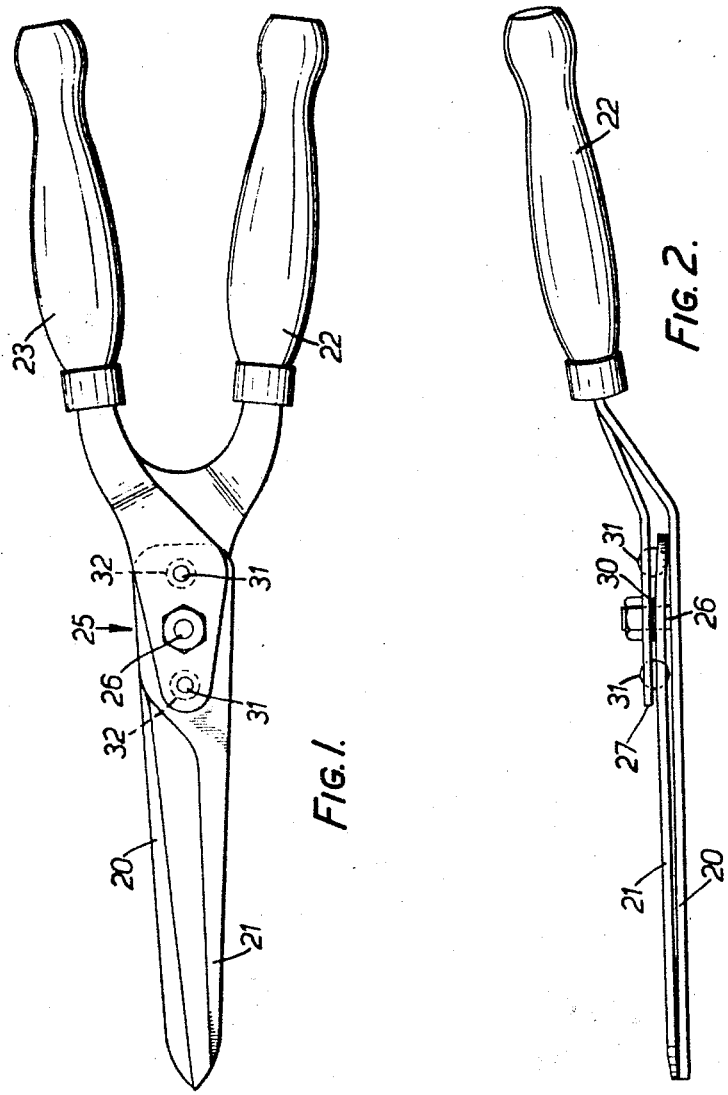

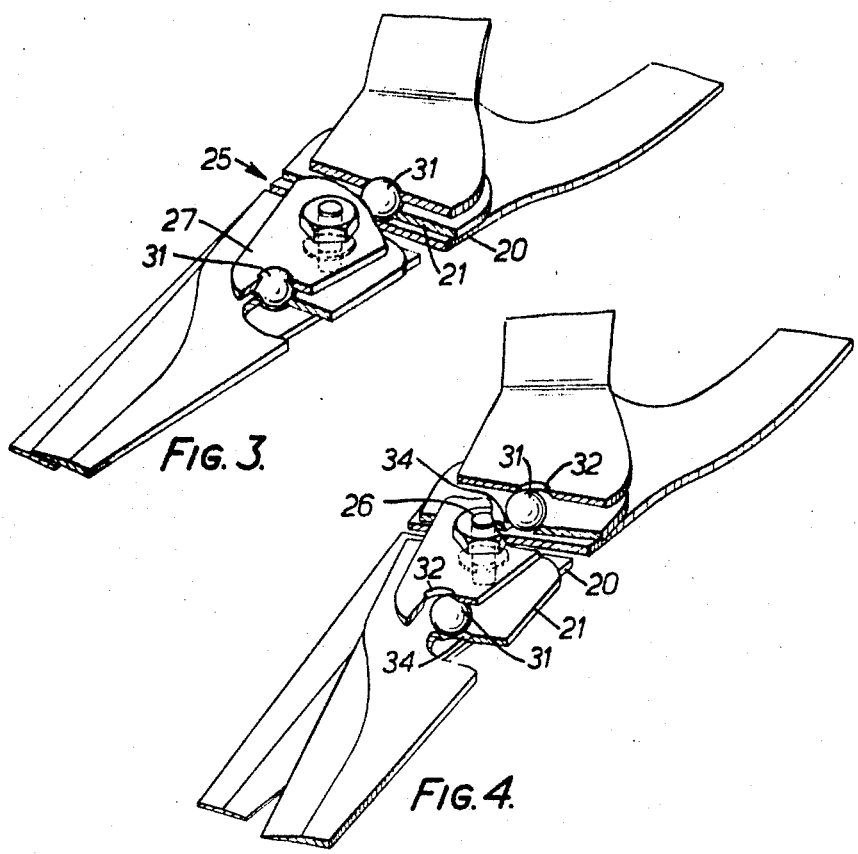
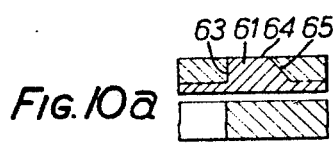
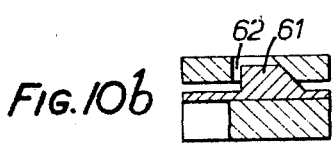
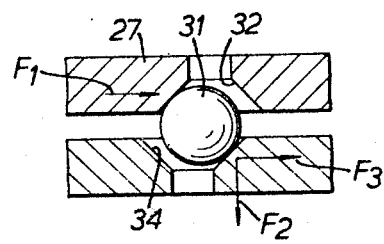

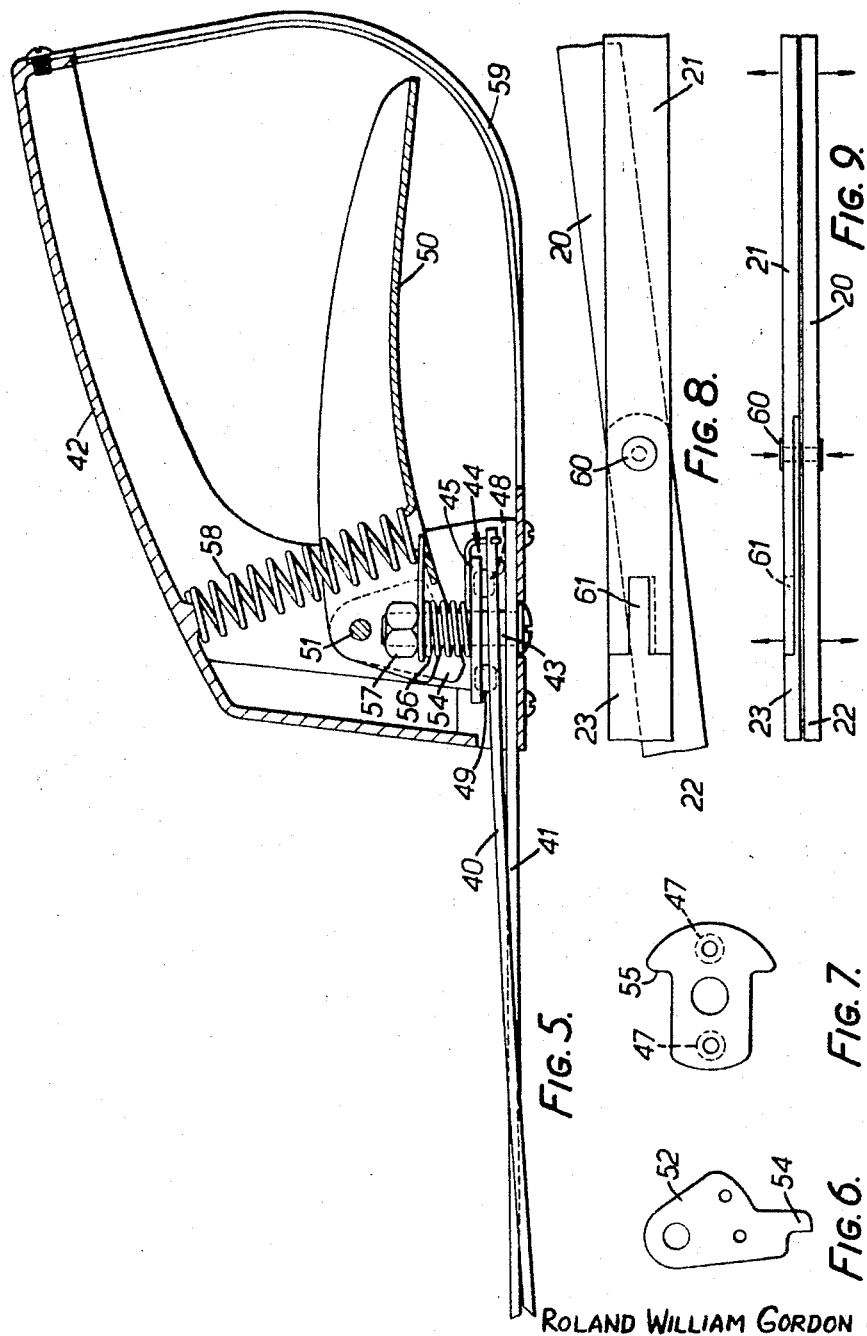

3,460,251
SHEARS, SCISSORS AND OTHER HANDTOOLS
Roland W. G. Somervell, Beaconfield, Buckinghamshire, and Nigel P. Kraty, Burnham, Buckinghamshire, England, assignors to Wilkinson Sword Limited, London, England, a British company
Filed Mar. 22, 1967, Ser. No. 625,069
Claims priority, application Great Britain, Mar. 29, 1966, 13,715/66
Int. Cl. A01g *3/04, 3/00;* B26b *13/00*
U.S. Cl. 30—248                                    7 Claims

ABSTRACT OF THE DISCLOSURE

A pair of shears has a first blade rigid with a first handle and a second blade connected to a second handle through a coupling. The coupling includes two balls each partly seated in a recess in the second handle or a part movable therewith and in a recess in the second blade or a part movable therewith. When in use and shearing relatively tough material the balls partly ride out of the recesses thereby generating forces which act to bias the blades together in a direction perpendicular to the direction of movement of the blades.

In another embodiment the shears have handles which are arranged to move in a direction perpendicular to the direction of movement of the blades.

The invention is applicable to other shearing tools such as scissors, tin snips, secateurs and the like.

---

This invention relates to shears, scissors and other handtools.

With conventional shears and scissors and other handtools, a fairly tight pivot assembly (in the axial sense) is required in order to provide sufficient force substantially to prevent the blades or other operative parts of the handtool from being forced apart when cutting tough material. However, the substantial force provided by the pivot assembly necessary to provide satisfactory operation under extreme conditions is often excessive for normal cutting conditions and may result in fatigue for the user and excessive wear on the shearing or other operative parts of the tool.

With scissors, and to some extent with shears, a skilled operator can provide the necessary force biassing the blades together in a direction normal to their direction of relative movement when a tough material is being cut. However, this is not entirely desirable since it increases the fatigue of the operator and may result in premature blunting of the blade cutting edges.

According to the present invention there is provided a handtool comprising a pair of pivotally-connected blades or other co-operating cutting or shearing members, a first handle rigid with a first said blade and a second handle connected to a second said blade through a coupling, said coupling being effective, when the tool is cutting or shearing a piece of material, to bias the blades towards one another in a direction perpendicular to the direction of their relative movement with a force which is related to the resistance offered by a given said material.

Further according to the present invention there is provided a handtool comprising a first blade rigid with a first handle and a second blade connected to a second handle by a coupling, said second blade being pivotally-connected to the first blade and said coupling being effective to transmit forces from the second handle to the second blade which forces serve to effect relative opening and closing movement of the blades and, when the tool is cutting or shearing a piece of material, to generate vector forces which serve to bias the blades together in a direction perpendicular to the direction of said opening and closing movement.

Yet further according to the present invention there is provided a pair of shears comprising a first handle rigid with a first blade, a second handle, a second blade pivotal with respect to the first blade and a coupling arranged to transmit forces from the second handle to the second blade, said coupling including a plate having two frusto-conical or part-spherical recesses disposed diametrically opposite one another with respect to the pivot axis, two similar recesses in said second blade and two balls accommodated in opposing said recess, relative movement of the handles causing the balls to ride partially out of said recesses and thereby generate forces in a direction normal to the direction of said relative movement which forces act to bias the blades towards one another.

Certain embodiments of shears in accordance with the invention will now be described, by way of example, with reference to the accompanying diagrammatic drawings, in which;

FIGURE 1 is a plan view of a pair of shears in accordance with the invention, arranged for two-handed operation;

FIGURE 2 is a side elevation of the shears of FIGURE 1;

FIGURE 3 is a fragmentary perspective view of part of the shears of FIGURE 1 and 2, parts thereof being cut away to indicate the mechanism;

FIGURE 4 is a view similar to FIGURE 3 but in which the mechanism is illustrated when the shears are in operation;

FIGURE 5 is a section in a vertical plane of a second embodiment;

FIGURE 6 is a side elevation of a component part of the embodiment of FIGURE 5;

FIGURE 7 is a side elevation of another component part of the embodiment of FIGURE 5;

FIGURE 8 is a fragmentary plan view of a further embodiment or modification which can be applied to either of the hereinbefore referred to embodiments;

FIGURE 9 is a side elevation of the modification of FIGURE 8;

FIGURES 10a and 10b are fragmentary cross-sections illustrating the manner of operation of the modification of FIGURES 8 and 9;

FIG. 11 is a fragmentary section illustrating the mode of operation of the first and second embodiments.

Referring now to the drawings, and in particular to FIGURES 1 to 3, the first embodiment takes the form of a pair of shears having two blades 20, 21 of generally conventional form, one of the blades 20 (a first blade), being directly and rigidly connected to a corresponding handle 22 (a first handle) whilst the other, or upper blade 21 (a second blade), as shown, is connected to its corresponding handle 23 (a second handle) through a force-transmitting coupling indicated generally by the reference 25. The lower blade 20 carries a conventional pivot pin or bolt 26 and is fast therewith. This pivot bolt 26 extends through a corresponding aperture (not shown) in the upper blade 21 and through an aperture in a handle plate 27 or other member rigid with the handle 23 of the upper blade 21. The upper end of the pivot bolt 26 carries a nut which is locked by conventional means (not shown). In order to provide a permanent force between the blades a spring washer 30 of dished form is arranged around the pivot bolt 26 between the upper face of the upper blade 20 and the lower face of the handle plate 27 as shown in FIGURE 2.

The coupling 25 operating to transmit force between the handle 23 of the upper blade and the upper blade 21 itself includes at least one pair of balls 31 arranged diametrically opposite one another in relation to the pivot bolt axis. Any additional ball or balls would, of course, be arranged symmetrically with respect to the remaining balls. The under face of the handle plate 27 is formed with two part-spherical or part-conical depressions or recesses 32, which depressions may pass right through the handle plate thus forming apertures and the upper face of the upper blade 20 is also formed with corresponding part-spherical or part-conical depressions or other recesses 34 in which the two balls nest. Again the recesses may take the form of apertures.

When the shears are inoperative, in the closed, open or intermediate positions, the two balls nest in the opposing depressions, but as soon as a force is applied to the handle 23 of the upper blade 20, there is a tendency for the ball to rise out of the corresponding depressions, but, because of the conical or spherical form thereof, a resultant vector force is generated which is in proportion to the closing force applied to the blades and acts in such a direction as to force the blades towards one another. The higher the force necessary to move the blades in the closing direction, the higher becomes the vector force acting to bias the blades towards one another. Normally, no substantial vector force will be generated when the blades are moved outwardly away from one another. The higher the resistance offered by the material being cut, the greater is the tendency for the balls 31 to rise out of the depressions or recesses 32, 34 and the vector force generated increases as the balls rise further from the nested position in the respective depressions.

It will be appreciated, that if the material to be cut offers relatively little resistance, the balls will rise from the depressions to a lesser extent and therefore the vector force is smaller. Thus, the high vector forces necessary for cutting particularly tough material are not always generated, thus reducing the self-wearing action of the blades. If desired, a ball race, not shown, can be interposed between the handle plate 27 and the pivot bolt 26 to allow relative rotation. In place of the dished spring, a helical or similar spring which biases the blades to an open position can be provided.

In the second embodiment illustrated in FIGURES 5, 6 and 7, the shears are arranged for single-handed operation and comprise a pair of blades 40, 41, each of conventional form. One of these blades, the lower or first blade 41, is, however, rigid with a cranked handle 42 of generally channel-section and upstanding from one end thereof and this blade carries a pivot pin 43 on which the other or upper blade 40 is pivotally mounted. The upper or second blade 40 is movable relatively to the lower blade 41, by a coupling arrangement 44 which takes the form of a plate 45 fast for rotation with the pivot pin 43 and having at least one frusto-conical recess or depression 47 (FIG. 7) in its face opposed to the upper face of the upper blade 40. The upper blade 40 has a corresponding frusto-conical recess or depression 48 in its opposed surface and a ball 49 is partially nested in each of the opposed recesses 47, 48. Additional recesses and balls may be provided if necessary.

The plate 45 is rotatable to drive the upper blade 40 by means of a second handle 50 also of generally channel-section and pivotally mounted in the first-mentioned handle 42 by means of a transverse pivot pin 51 and the second handle 50 carries plate 52 with a depending finger 54 (FIG. 6) which engages in a shoulder 55 on the periphery of the plate 45. The second handle 50 is so mounted that it moves in a plane normal to the shearing plane of the blades and this movement serves to move the finger 54 and thereby rotate the disc 45 through a small angle. A helical spring 56 is coiled around the pivot pin 43 and lies between the upper face of the plate 45 and a nut 57 screwed to the upper end portion of the pivot pin 43. The spring 56 may act either to exert an initial pressure tending to force the blades together in a direction normal to the shearing plane or may tend to bias the blades apart (in their own plane) or may alternatively carry out both of these functions. The handles 42, 50 are biased apart by a helical spring 58 the ends of which are engaged on bosses of the handles. The handle 50 lies within a curved guard 59 extending between the free end of the handle 42 and the pivot pin 43.

The coupling of the second embodiment is effective to transmit torque in substantially the same manner as in the first embodiment, the higher the resistance force offered by the material being sheared in a sense to force the blades apart, the higher the vector force exerted by the ball or balls on the walls of the frusto-conical recesses in a sense to resist the material-generated force. Thus, again as in the first embodiment, if the material offers only a low resistance to shearing, the reaction force will be correspondingly low and blade wear will be avoided.

Referring now to the modification illustrated in FIGS. 8 to 10, similar parts are given the same reference numerals as similar parts in FIGS. 1 to 4. The pivot pin takes the form of a simple rivet 60 and the coupling includes a wedge 61 which extends into a slot 62 in the blade 21 and stands proud of the handle 23 which is rigid therewith. The wedge 61 and the slots 62, have a cross-section with one upright side 63, a side 64 parallel to the surface of the main part of the handle and a sloping concave side 65 (the corresponding side of the slot is, of course, convex). As can be seen from FIG. 10a, when the shears are inoperative, the wedge 61 lies substantially wholly within the slot 62, but, as shown in FIG. 10b, when the shears are actively cutting a tough material, the blade 21 is forced upwardly out of the slot 62, thus forcing the cutting edges of the blades 20, 21 towards one another. As in the hereinbefore described embodiments, the higher the resistance of the material, the higher the vector force generated by the wedge and slot, which biasses the cutting edges together in a direction normal to the direction of relative movement of the blades.

The mode of operation of the first and second embodiments is illustrated in FIG. 11. One of the balls 31 (or 49) is illustrated when a force F, is applied to the coupling through the handle plate 27 (or the plate 45). The ball 31 rises out of the recess 32 in the handle plate 27 and also out of the recess 34 and, as a result, the force $F_1$ is transmitted between the points of contact of the ball and recesses. The force $F_1$ is thereby changed in direction and can be resolved into vector forces $F_2$ and $F_3$. The vector force $F_3$ acts in the same direction as the force $F_1$, that is to close the blades, whilst the vector force $F_2$ acts in a direction biassing the blades together and resist the parting forces set up by the material. As the ball rides up the surface of the recesses, as a result of higher resistance by material being cut, the vector force $F_2$ is correspondingly increased. By selecting a particular profile for the recesses, it is possible to control the increase in the vector force $F_3$ acts in the same direction as the force In a modification of the second embodiment, a part of the movable blade on the side of the pivot pin remote from the operative part of the blade is provided with two pips on the face thereof opposite the corresponding part of the fixed blade. These pips serve to reduce friction between the blades.

I claim:
1. A hand tool comprising:
    a pair of pivotally-connected co-operating shearing members,
    a first handle rigid with a first said member,
    a second handle connected to a second said member, and
    a coupling between said second handle and said second member, said coupling comprising
    at least one rollable member, said second handle having a recess therein and said second shearing member having a recess therein, each said recess having a frusto-conical surface and each partly nesting said rollable member, said coupling being effective, when the tool is shearing a piece of material, to bias the blades towards one another in a direction perpendicular to the direction of their relative movement with a force which is related to the resistance offered by a given said material.

2. A hand tool comprising:
   a first blade,
   a first handle connected to the first blade,
   a second blade, said second blade having a recess therein,
   a second handle, said second handle having a recess therein, and
   a rollable member, each said recess partly nesting said rollable member,
   said second blade being pivotally-connected to the first blade and said rollable member serving to connect the second blade and the second handle and being effective to transmit forces from the second handle to the second blade, which forces serve to effect relative opening and closing movement of the blades and, when the tool is cutting a piece of material, to generate vector forces which serve to bias the blades together in a direction perpendicular to the direction of said opening and closing movement.

3. A hand tool according to claim 1, wherein two said rollable members and corresponding recesses are provided, said rollable members and recesses being disposed symmetrically with respect to the pivot axis of said shearing members.

4. A hand tool according to claim 1, wherein said handles are relatively movable in a plane normal to the direction of relative movement of the shearing members.

5. A hand tool according to claim 4, comprising
   a finger carried by the second handle, and
   a plate forming a part of the coupling,
   movement of said second handle relatively to the first handle causing said plate to move the second shearing member relatively to the first shearing member.

6. A hand tool according to claim 5, wherein said coupling includes a spring which biasses said plate towards other parts of said coupling.

7. A pair of shears comprising:
   a first handle,
   a first blade rigid with the first handle,
   a second handle,
   a second blade pivotal with respect to the first blade, and
   a coupling arranged to transmit forces from the second handle to the second blade,
   said coupling including:
      a plate having two frusto-conical recesses disposed diametrically opposite one another with respect to the pivot axis, said second blade having two frusto-conical recesses, and
      two balls accommodated in opposing said recesses, relative movement of the handles causing the balls to ride partially out of said recesses and thereby generate forces in a direction normal to the direction of said relative movement which forces act to bias the blades towards one another.

References Cited

UNITED STATES PATENTS

| | | | |
|---|---|---|---|
| 2,958,944 | 11/1960 | Wertepny | 30—248 |
| 3,064,351 | 11/1962 | Kuchta | 30—248 |
| 3,296,697 | 1/1967 | Hedstrom | 30—248 |
| 3,325,896 | 6/1967 | D'Angelo | 30—248 |

ROBERT C. RIORDON, Primary Examiner

J. C. PETERS, Assistant Examiner

U.S. Cl. X.R.

30—254, 268